Figure 1:
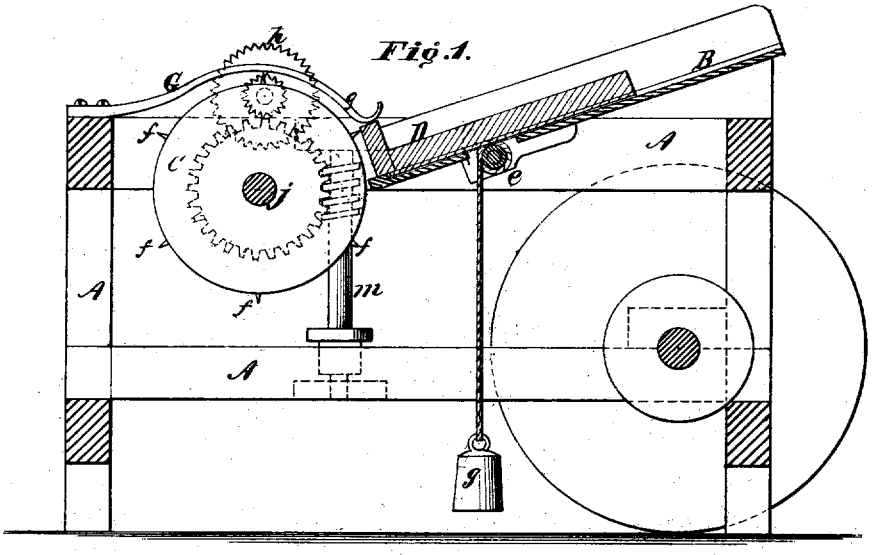

H. ELLIOTT, E. SMITH & S. S. GRAY.

Improvement in Machines for Crozing Staves.

No. 4,411. Reissued June 6, 1871.

Witnesses.

Amos A. Stevens.

M. S. G. Wilde.

Inventor.

Harrison Elliott.

AM. PHOTO-LITHOGRAPHIC CO. N.Y. (OSBORNE'S PROCESS.)

UNITED STATES PATENT OFFICE.

HARRISON ELLIOTT, ELIJAH SMITH, AND SOLOMON S. GRAY, OF BOSTON, MASSACHUSETTS, ASSIGNEES, BY MESNE ASSIGNMENTS, OF H. ELLIOTT.

IMPROVEMENT IN MACHINES FOR CROZING STAVES.

Specification forming part of Letters Patent No. 86,912, dated February 16, 1869; reissue No. 4,411, dated June 6, 1871.

*To all whom it may concern:*

Be it known that HARRISON ELLIOTT, of Boston, in the county of Suffolk and State of Massachusetts, invented an Improvement in Machines for Crozing Staves, of which the following, taken in connection with the drawing which accompanies and forms part of this specification, is a description sufficient to enable those skilled in the art to practice the invention.

The invention consists, primarily, in the combination, with a double set of rotary cutting-off saws, crozing saws or cutters, and chamfering cutters, (one set for each end of the stave,) of two rotating drums or disk-wheels, provided with teeth or pins, which receive the staves (stave by stave) and present them in succession to the action of said cutting-off, crozing, and chamfering mechanism.

The drawing represents a machine embodying the invention.

Figure 2:
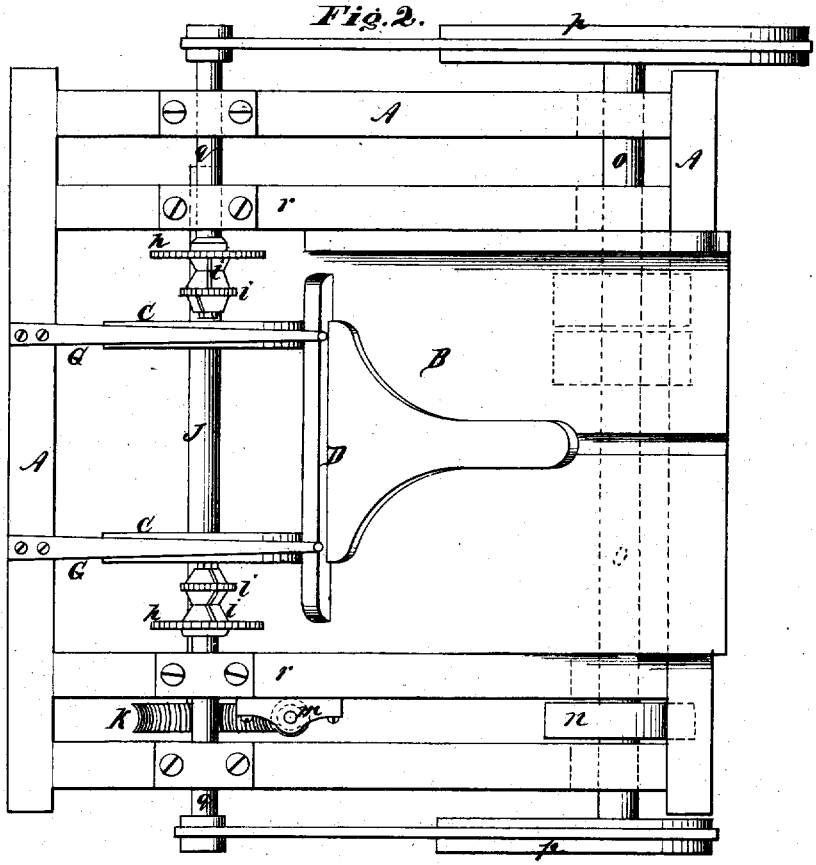

Figure 1 represents a vertical longitudinal section of the machine. Fig. 2 is a plan of the same.

A denotes the frame for supporting the operative parts of the machine. *j* is a horizontal shaft journaled in suitable bearings on the rails *r r* of the frame, and having fixed upon it two disk wheels or drums, C, from the periphery of each of which project teeth or pins *f*, by means of which the disk-wheels carry the staves to the action of the dressing mechanism, the rotation of the disk or carrier wheel being effected by means of an endless screw on a vertical shaft, *m*, meshing into and driving a worm-wheel, *k*, on the disk-shaft *j*, the shaft *m* being driven in any suitable manner. Upon each side of the frame A are bearings, in which is journaled a short shaft or arbor, *q*, each arbor carrying a circular cutting-off saw, *h*, a rotary chamfering knife or cutter, *i'*, and a crozing-saw, *i*, and each arbor, *q*, (with its cutting, chamfering, and grooving tools,) is so arranged relatively to the adjacent disk-wheel C that as the opposite ends of the stave-blank on the two wheels pass over the two arbors *q* the under surface of the stave is chamfered and crozed at both ends, and both ends of the blank are cut off, bringing all the blanks to a uniform length, corresponding to the distance between the cutting-off saws. On one side of the wheel C is a table, B, the end of which, adjacent to the edges of the wheels C, is in such position relatively to the wheels that if a stave-blank is placed at the end of the table with its inner face toward the wheels the opposite ends of said blank will be seized by two pins of the wheels C and carried around upon the peripheries of the wheels, the stave-blank passing under the free ends of two long springs, G, which are fastened at their opposite ends to the top of the frame, as seen in Fig. 2.

As the feed or carrier wheels rotate they carry the blank on until it reaches the two saws *h*, which cut off its opposite ends, leaving the blank of proper length to form the stave. It then passes over the crozing-saws *i*, which cut the two crozes or grooves in its under surface, and over the chamfering-cutters *i'*, which chamfer from each croze to the end of the blank, the springs G holding the opposite ends of the blank down to the peripheries of the disk-wheels and to the action of the cutting-off, crozing, and chamfering mechanism. Thus dressed or finished the stave continues to be carried on by the pins or teeth of the rotating carrier-wheels until the blank comes into position to drop from the wheels. The table B is to be kept supplied with blanks, so that by pressing the series toward the wheels the pins will take up the blanks, one by one, so long as any are presented, the length of the pin causing one, and but one, blank to be taken by each two opposite pins. To automatically present the successive blanks the table is provided with a slide or follower, D, in front of which the blanks are placed on the table, the follower being carried toward the wheel by a weight, *g*, attached to one end of a cord whose other end is fastened to the follower, the cord running on a suitable sheave or pulley, *e*. The table B is inclined, as seen in Fig. 1.

By means of a machine thus organized the dressing of staves, so far as relates to cutting them to uniform length and accurately crozing and chamfering them, may be very rapidly and cheaply effected, and the mechanism is simple and easily run.

What is claimed is—

1. In combination with the cutters and carrier-wheels herein described, the table B for presenting the staves to the action of the teeth of the carrier-wheels, substantially as specified.

2. In combination with the carrier-wheels and table, the slide or follower D and mechanism for operating said follower, substantially as described.

3. In combination with the carrier-wheels and cutters, the springs G for holding the blanks to the wheels and to the action of the cutters, substantially as described.

HARRISON ELLIOTT.
ELIJAH SMITH.
SOLOMON S. GRAY.

Witnesses:
J. B. CROSBY,
FRANCIS GOULD.